Jan. 8, 1929.
W. I. MIDDLETON ET AL
1,698,704
PORTABLE ELECTRIC CABLE
Filed Jan. 10, 1925
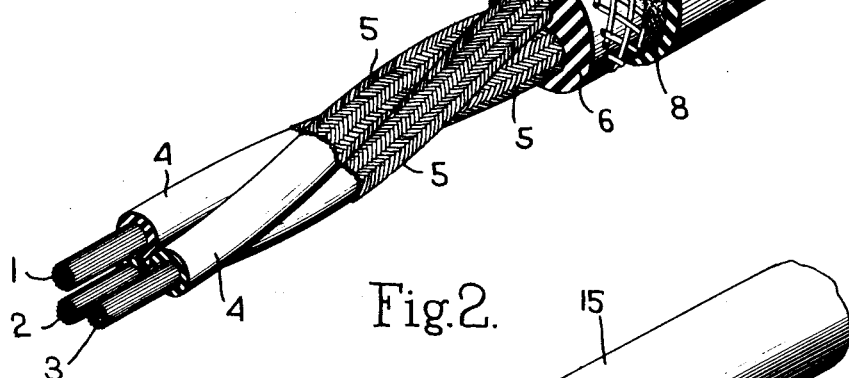
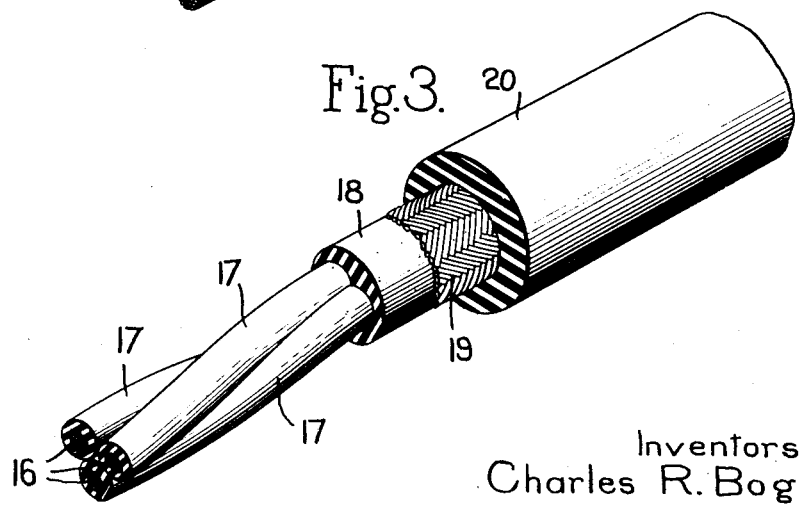
Inventors.
Charles R. Boggs
Washington I. Middleton
by Heard Smith & Tennant
Attys.

Patented Jan. 8, 1929.

1,698,704

UNITED STATES PATENT OFFICE.

WASHINGTON I. MIDDLETON, OF WATERTOWN, AND CHARLES R. BOGGS, OF WABAN, MASSACHUSETTS, ASSIGNORS TO SIMPLEX WIRE & CABLE COMPANY, OF BOSTON, MASSACHUSETTS, A CORPORATION OF MASSACHUSETTS.

PORTABLE ELECTRIC CABLE.

Application filed January 10, 1925. Serial No. 1,548.

This invention relates to the construction of, and the method of constructing a flexible, portable, power-transmitting electric cable. Such cables are designed particularly for conducting an electric current from a power line, generator, or other source of electrical energy to a movable utilizer of such energy, as for example a motor for operating a machine.

Such a cable is particularly designed to withstand rough usage in all sorts of places, both indoors and out of doors. An example of such rough usage is in mining operations where a long length of cable is used to transmit electrical energy to large and powerful portable mining machines. Under such conditions the cable is subject to extremely rough usage. It is dragged from place to place over the rough floor of the mine passageways; it is caught or kinked about obstructions; it is handled by more or less unskilled labor; it is jerked about in the dark or under a poor light where it cannot be seen; it lies in or is dragged through water; it may be brought into contact with acids such as sulphuric acid formed when sulphur is present. Such a portable cable must stand up under such conditions for a long period of time to be of practical service. The conductor and the insulation and protective coverings must not become loosened or separated or broken down or wear through so as to short circuit the current, otherwise life and property will be in danger and the cable will also fail to attain its essential object of transmitting the current.

Such portable cables are designed for carrying an electric current of comparatively low tension well under ten thousand (10,000) volts and usually in the vicinity of half that amount, the limit of voltage for such portable cables being recommended by the American Institute of Electrical Engineers at ten thousand (10,000) volts.

It has been found that if the portable power-transmitting electric cable be provided with a heavy exterior rubber-compound jacket, preferably reenforced with a continuous, reticulated, concentric, filamentary reinforcement embedded therein, or in other words preferably with a jacket having a construction similar to the well known automobile tire, that many of the imperative requirements for such a cable are met. Such a rubber-compound jacket, preferably reenforced, is capable of withstanding the severe wear to which the cable is subject; it not only has the necessary strength but it has the required flexibility; it is waterproof; it is acid proof; it presents a non-metallic surface and, therefore, avoids the making of any dangerous electric connection or of emitting sparks when struck, either of which events might in many instances ignite inflammable gases or otherwise produce fires or explosions.

But there is one serious objection to this otherwise highly efficient rubber compound jacketed cable, which objection is eliminated by the present invention. This objection is due to the fact that the exterior rubber jacket and the conductor insulation are readily attacked and deteriorated or destroyed by ozone. Ozone is produced under certain circumstances by the action of the electrostatic stresses upon air caused by the voltage carried by the cable and as air is always present at the exterior surface of the jacket the deleterious action of the ozone is especially severe but the rubber-compound exterior surface is essential to meet the requirements of wear and strength, to be proof against water and acid, and to expose a non-metallic surface.

The primary object and purpose of the present invention is, therefore, to prevent the occurrence of ozone in, or in proximity to, this rubber-compound jacket or the conductor insulation when containing rubber and this object is efficiently and effectively secured by the present invention.

An understanding of the electrical and chemical theories and reactions involved is not necessary to a practical utilization of the invention. But in a general way it may be understood that ozone is produced when the electrostatic stress or voltage gradient across a layer of air exceeds a certain critical value producing a so-called "silent discharge." This critical value may be readily exceeded in the layers of air between the outer surfaces of the jacket and ground and in the air pockets within the outer jacket at the voltages at which these portable cables are operated. When this stress takes place through, or this discharge encounters, air as for example at the surfaces of, or in pockets within, the rubber compound jacket or the conductor insulation when containing rubber ozone is formed and such ozone, peculiarly effective possibly because of its nascent state, has a powerful destructive action upon the rubber. A process of oxidation takes place which destroys the rubber, produces cracks and fissures in the jacket or in the insulation and renders them unfit to meet at all the requirements. Undoubtedly other substances are produced or released along with the ozone which are more or less deleterious to rubber but the ozone is sufficient of itself to destroy the insulation and the jacket.

There are at present three materials which are chiefly employed commercially for cable insulation, namely paper, varnished cambric, and rubber or rubber compounds. The first two are not subject to attack by ozone but they do not meet the requirements of the jacket for a portable power-transmitting electric cable for the reasons already set forth. Hence the further importance of preventing the deterioration or destruction by ozone of the rubber compound jacket.

The present invention resides in providing a flexible metal jacket surrounding the insulated conductor and located at a substantial distance from the exterior surface of the cable and adequately imperforate to prevent the passage of electrostatic lines or electrostatic stress therethrough sufficient to form ozone, thus confining the electrostatic stress to the local insulation of the conductor and rendering it impossible for any electrostatic stress or "silent discharge" to take place through, or at the surface of, the rubber compound jacket with its resultant formation of ozone at the exterior surface of, or in air pockets within, or at the interior surface of, said jacket. The particular location of the metal jacket, provided it is well within the cable from the exterior surface of the rubber-compound jacket, will vary according to the number of conductors and the particular internal construction of the cable. While the invention thus effectively eliminates the formation of ozone and consequently eliminates the deterioration or destruction of the jacket by ozone, it does this without impairing to any noticeable extent the advantages obtained by the rubber-compound jacket, and thus renders the rubber-compound jacket a well nigh perfect jacket for meeting the requirements of a flexible, portable power-transmitting electric cable.

Furthermore in achieving the principal object of the invention, namely, the prevention of the formation of ozone where it would attack the rubber-compound jacket a still further desirable result is achieved by means of the metal jacket. That portion of the cable within the metal jacket is indirectly but quite substantially protected because the metal jacket may, or should be, fitted as tightly as practical over this interior portion, thus to a substantial extent minimizing the possibility of the presence of air pockets inside the metal jacket. While, therefore, electrostatic stress may take place between the conductor, which is within the metal jacket, and the metal jacket itself, ozone can not be formed inside the metal jacket because air will not be present and consequently any rubber employed in the interior insulation will not be injured by the presence of ozone. The metal jacket is preferably formed by braiding, serving or winding wire closely and compactly and consequently the metal jacket may be caused to fit very tightly over that portion of the cable enclosed thereby.

The invention is particularly effective in the case of polyphase cables of the character in question having a plurality of conductors such for example as the three conductors commonly employed in power transmission. In the case of such a cable provided with the exterior rubber-compound jacket the objections obviated by the present invention are peculiarly serious. Electrostatic stresses of pulsating intensities exist not only between each conductor and the ground but also between the various conductors themselves and all of these stresses to a varying extent are exerted through the exterior rubber-compound jacket thus placing the air at the exterior surface of the cable also under stress and producing the deleterious ozone in varying amounts at different portions of the rubber-compound jacket, and also in any air spaces between the individual conductors.

Portable, power-transmitting, electric, conductor cables according to present practice are usually between two hundred and seven hundred and fifty (200 and 750) feet in length and consequently when the metal jacket employed in this invention is grounded the cable becomes a "safety" cable which is obviously advantageous.

The nature and objects of the invention will appear more fully from the accompanying description and drawings and will be particularly pointed out in the claims.

The drawings illustrate different forms of cable embodying the preferred forms of the invention.

In the drawings:

Fig. 1 is a perspective view illustrating a section of a three conductor cable with portions of the elements making up the cable stripped away to show the general construction;

Fig. 2 is a similar view of a single conductor cable;

Fig. 3 is a view similar to Fig. 1 of another form of three conductor cables.

A specific embodiment of a preferred form of the present invention is disclosed in connection with the ordinary type of three conductor cable for carrying the three phase alternating current. Such a construction embodying the invention is shown in Fig. 1.

The conductors 1, 2 and 3 may be of any desired form and construction. They are herein shown as made up of a cylindrical bundle of a plurality of wires and, with their local coverings, twisted together. These conductors are carefully insulated from each other. The immediate insulation 4 of each conductor may be of any suitable material applied in any suitable manner and may include, or consist of, rubber or rubber compound.

In this illustrated construction each insulated conductor is next enclosed by a flexible metal jacket 5 to effect an embodiment of the invention. These metal jackets are preferably formed of copper wire braided, served, or wound tightly about the insulated conductors. The metal jacket must be so formed and laid as to be adequately imperforate to prevent passage of electrostatic lines or the occurrence of electrostatic stress therethrough to a sufficient extent to form ozone. The desired flexibility or resiliency is secured by forming the metal jacket of wire and it is preferably laid up so closely as to be practically imperforate. It is possible for interstices in the metal jacket to be present provided they are not large enough to permit free paths to the electrostatic lines or lines of stress of a length sufficient to break down the air and form ozone. But as a practical matter no difficulty is experienced in forming the metal jacket by a braiding or similar operation, as illustrated, which will be sufficiently imperforate to secure the desired result.

Furthermore, as already noted, these jackets should fit as tightly as possible the enclosed insulated conductors and thus ensure absence of air pockets inside of the metal jackets, which if present would to a limited extent be deleterious to the local insulation 4 if containing rubber because electrostatic stress between each wire conductor and its metal jacket cannot be prevented.

The exterior jacket for the cable illustrated in Fig. 1 is of the cord or fabric reenforced rubber compound construction. Such a jacket may be of varying forms of construction. As illustrated a body 6 of a suitable rubber compound is formed into cylindrical shape and into close contact with the metal jacketed, twisted, conductors so as to fit snugly around and between the same, extending in between the conductors to a feather edge. Over this cylindrical body 6 is formed a continuous reticulated filamentary reenforce, such as the cotton cord reenforce 7, which may be laid on with a braiding, serving or winding operation and with this reenforce is laid on a relatively thin layer 8 of material inducing adhesion between rubber compound coatings. Such a material is preferably a suitable rubber cement or a substance such as an oil which, when brought into contact with the rubber compound, will produce a cementitious effect.

The reenforce forms a continuous, concentric layer in the cable and the reticulations enable the required union between the layers of the rubber compound to be effected. While a single concentric reenforce is illustrated it is obvious that the number and arrangement of the reenforcing layers may be as desired.

Over the reenforcing layer, in the form illustrated, is then placed the main body 9 of the rubber compound jacket. This is formed of a suitable rubber compound of high quality such as required to meet the conditions. It should be tough, wear resisting, flexible, waterproof, acid proof, and in general of high grade.

The entire cable is then subjected to a suitable vulcanizing operation, preferably under pressure secured in a suitable manner, so that as a result the constituent elements are brought into firm and intimate union. In practice the layers of rubber compound 6 and 9 with the interposed reenforce 7 and adhesive inducing material 8 are so intimately united that a very high resistance is offered against any attempt to separate them.

The filamentary reenforce, having no filaments extending longitudinally of the cable, is highly flexible and greatly strengthens the rubber-compound jacket, protecting the enclosed conductors and preventing tears or cuts in the outer body 9 from extending inwardly beyond the reenforce.

The construction of cable shown in Fig. 2 is similar to that shown in Fig. 1. Herein there is but a single wire conductor 10 illustrated. Consequently the local insulation 11, the metal jacket 12, the rubber compound body 13, the reenforce 14, and the exterior portion 15 of the rubber compound jacket are all concentric but otherwise may be constructed in the same manner as already described. In single conductor construction it is usually necessary that the metal jacket be grounded in order to obtain the benefits of the invention, but this is not necessarily true of a multiple conductor construction.

It is not essential to the protection of this rubber-compound jacket that each conductor shall be surrounded by a separate metal jacket. In the construction illustrated in Fig. 3 a three conductor cable is shown in which the conductors 16 each having the local insulation 17 are twisted together and then surrounded by a rubber compound body 18 similar to that shown at 6 in Fig. 1. The metal jacket 19 is then laid in place over the body 18 and then the exterior portion 20 of the rubber-compound jacket is laid on. Thus it will be seen that the metal jacket 19 is located at a substantial distance inwardly from the exterior surface of the rubber-compound jacket 20 and encloses and embraces the inner portion of the cable including the conductors. Such a construction prevents the exterior body of the rubber-compound jacket 20 from being attacked by ozone and thus deteriorated or destroyed.

Having thus described the invention what is claimed as new and desired to be secured by Letters Patent is:

1. A flexible, portable, power-transmitting, polyphase, electric cable comprising a plurality of conductors; an insulation coating surrounding each conductor; a flexible, tight-fitting, metal jacket, adequately imperforate to prevent the passage of electro-static lines therethrough sufficient to form ozone surrounding each aforesaid insulation coating; a rubber-compound jacket surrounding and enveloping all of the insulated and jacketed conductors and presenting a smooth, tough wear-resisting exterior surface; a continuous, reticulated, concentric, filamentary reenforce embedded in the said rubber-compound jacket: the said rubber-compound jacket and embedded reenforce being vulcanized under pressure into a firm and intimate union, whereby, without deleterious diminution of flexibility, resistance against separation of the constituent parts of the cable under the strains of kinking, bending, stretching and rough usage is secured and whereby no silent discharge can take place through, or at the surface of, the said rubber-compound jacket and consequently no formation of ozone injurious to the rubber compound can occur at the exterior surface of, or in air pockets within, or at the exterior surface of, the said rubber-compound jacket.

2. A flexible, portable, power-transmitting, electric cable comprising a conductor; an insulation coating surrounding the conductor; a flexible, tight fitting, metal jacket, adequately imperforate to prevent the passage of electro-static lines therethrough sufficient to form ozone surrounding the aforesaid insulation coating; a rubber-compound jacket surrounding and enveloping the insulated and metal jacketed conductor and presenting a smooth, tough, wear-resisting exterior surface; a continuous, reticulated, concentric filamentary reenforce embedded in the said rubber-compound jacket; the said rubber-compound jacket and embedded reenforce being vulcanized under pressure into a firm and intimate union, whereby, without deleterious diminution of flexibility, resistance against separation of the constituent parts of the cable under the strains of kinking, bending, stretching and rough usage is secured and whereby no silent discharge sufficient to form ozone can take place through, or at the surface of, the said rubber-compound jacket and consequently no formation of ozone injurious to the rubber-compound can occur at the exterior surface of, or in air pockets within, or at the interior surface of, the said rubber-compound jacket.

3. The method of forming a flexible, portable, power transmitting, polyphase, electric cable which consists in surrounding each of a plurality of conductors with an insulating coating; in surrounding each of said insulated conductors with a flexible, tight-fitting, metal jacket, adequately imperforate to prevent the passage of electrostatic lines therethrough to form ozone; in surrounding the said plurality of insulated and metal-jacketed conductors with a layer of rubber compound; in surrounding said rubber compound layer with a continuous, reticulated, concentric, filamentary reenforce and a thin layer of material inducing adhesion between rubber compounds; in surrounding the foregoing with a layer of tough, wear-resisting, flexible water and acid-proof rubber compound; and in vulcanizing the cable thus formed under pressure, thus bringing the rubber compound jacket with the embedded reenforce into a firm and intimate union whereby, without deleterious diminution of flexibility, resistance against separation of the constituent parts of the cable under the strains of kinking, bending, stretching and rough usage is secured and whereby no silent discharge can take place through, or at the surface of, the said rubber-compound jacket and consequently no formation of ozone injurious to the rubber compound can occur at the exterior surface of, or in air pockets within, or at the exterior surface of, the said rubber-compound jacket.

4. The method of forming a flexible, portable, power transmitting, polyphase, electric cable which consists in surrounding a conductor with an insulating coating; in surrounding the said insulated conductor with a flexible, tight-fitting, metal jacket, adequately imperforate to prevent the passage of electrostatic lines therethrough to form ozone; in surrounding the said insulated and metal-jacketed conductor with a layer of rubber compound; in surrounding said rubber compound layer with a continuous, reticulated, concentric, filamentary reenforce and a thin layer of material inducing adhesion between rubber compounds; in surrounding the foregoing with a layer of tough, wear-resisting, flexible water and acid-proof rubber compound; and in vulcanizing the cable thus formed under pressure, thus bringing the rubber compound jacket with the embedded reenforce into a firm and intimate union, whereby no silent discharge sufficient to form ozone can take place through, or at the surface of, the said rubber-compound jacket and consequently no formation of ozone injurious to the rubber-compound can occur at the exterior surface of, or in air pockets within, or at the interior surface of, the said rubber-compound jacket.

In testimony whereof, we have signed our names to this specification.

WASHINGTON I. MIDDLETON.
CHARLES R. BOGGS.